UNITED STATES PATENT OFFICE.

RICHARD LEMARE, OF NEW YORK, N. Y.

IMPROVEMENT IN ARTIFICIAL STONE.

Specification forming part of Letters Patent No. 136,604, dated March 11, 1873.

*To all whom it may concern:*

Be it known that I, RICHARD LEMARE, of New York city, county of New York, and State of New York, have invented a certain Composition for Manufacturing an Improved Artificial Stone, of which the following is a specification.

The nature of the said invention consists in substituting a material known as gas-house dust or "gas-retort breeze," instead of sand or shingle, as used in the manufacture of artificial stone at this present time, for laying down sidewalks and floors, for covering roofs, and for architectural castings, such as chimney-caps, &c.

To prepare the composition, take of hydraulic or Portland cement, one measured part, spreading it on a board (dry) to cool; then take four measured parts of gas-retort breeze, clean washed and allowed to dry; then pound these together while dry; add water, and mix to the consistency of mortar.

This composition, when set hard, is found to contain greater hydraulic properties, and is more ductile, and has a less tendency to split, than cement and ordinary sand; therefore is more adapted for the purposes set forth.

I claim—

A composition of the above-mentioned materials, to wit, hydraulic cement and gas-retort breeze or dust.

RICHARD LEMARE.

Witnesses:
JAMES WALKER,
HOWARD HENRY WILLIAMS.